United States Patent [19]

Wilkes

[11] 4,439,827
[45] Mar. 27, 1984

[54] DUAL FETCH MICROSEQUENCER

[75] Inventor: Dean M. Wilkes, Sharon, Mass.

[73] Assignee: Raytheon Company, Lexington, Mass.

[21] Appl. No.: 335,026

[22] Filed: Dec. 28, 1981

[51] Int. Cl.³ .............................................. G06F 9/18
[52] U.S. Cl. ................................................. 364/200
[58] Field of Search ............................... 364/200, 900

[56] References Cited

U.S. PATENT DOCUMENTS

| | | | |
|---|---|---|---|
| 3,573,853 | 4/1971 | Watson et al. | 364/200 |
| 3,764,988 | 10/1973 | Onishi | 364/200 |
| 3,771,138 | 11/1973 | Celtruda et al. | 364/200 |
| 3,771,141 | 11/1973 | Culler | 364/200 |
| 3,812,473 | 5/1974 | Tucker | 364/200 |
| 3,940,741 | 2/1976 | Horikoshi et al. | 364/200 |
| 4,050,058 | 9/1977 | Garlic | 364/200 |
| 4,062,058 | 12/1977 | Haynes | 364/200 |
| 4,110,822 | 8/1978 | Porter et al. | 364/200 |
| 4,124,891 | 11/1978 | Weller et al. | 364/200 |
| 4,145,736 | 3/1979 | Yamada et al. | 364/200 |
| 4,156,925 | 5/1979 | Tutt et al. | 364/200 |
| 4,200,927 | 4/1980 | Hughes et al. | 364/200 |
| 4,236,210 | 11/1980 | Terakawa et al. | 364/200 |
| 4,338,661 | 7/1982 | Tredennick et al. | 364/200 |
| 4,373,180 | 2/1983 | Linde | 364/200 |

Primary Examiner—Jerry Smith
Assistant Examiner—Jameson Lee
Attorney, Agent, or Firm—William R. Clark; Joseph D. Pannone

[57] ABSTRACT

A dual fetch microsequencer having two single-ported microprogram memories wherein both the sequential and jump address microinstructions of a binary conditional branch can be simultaneously prefetched, one from each memory. The microprogram is assembled so that the sequential and jump addresses of each branch have opposite odd/even polarities. Accordingly, with all odd addresses in one memory and even in the other, the first instruction of both possible paths can always be prefetched simultaneously. When a conditional branch microinstruction is loaded into the execution register, its jump address or a value corresponding to it is transferred to the address register for the appropriate microprogram memory. The address of the microinstruction in the execution register is incremented and transferred to the address register of the other microprogram memory. Prefetch delays are thereby reduced. Also, when a valid conditional jump address is not provided, that microprogram memory may be transparently overlayed during that microcycle.

11 Claims, 11 Drawing Figures

DUAL FETCH MICROSEQUENCER

BACKGROUND OF THE INVENTION

As is well known, microprograms generally have branch decision points where selections between alternate microinstruction paths are made. Typically, the selection process at a decision point involves directing the controller to execute one of two different microprogram sequences as a result of a test. For example, if the test is FALSE the next microinstruction is fetched using the next sequential microinstruction address; however, if the test is TRUE, the next microinstruction is fetched using the branch or jump address field of the present microinstruction. Since selection of the correct path can not be determined until the test results are valid, the fetching of the next microinstruction is delayed.

The microinstruction sequencer and fetch mechanism may be considered the most basic elements of a microprocessor or computer as they are commonly exercised many times for the execution of each machine instruction. Accordingly, the additive effect of delays in the sequencer can significantly impact the performance of the processor or, in the case of a CPU, the overall system.

The most common prior art technique for minimizing the above described fetch delays is to prefetch using the next sequential microinstruction address before the test results become valid. If the selection is the correct choice, then no delay is incurred. If the choice is incorrect, the fetched microinstruction is ignored and the branch microinstruction is fetched. The incorrect choice results in an additional cycle time to fetch the correct microinstruction but it does not occur at each branch decision point. Some improvement in this basic technique has been provided by what has been referred to as "branch prediction strategies". One method is to utilize a bit in the test microinstruction to predict the most likely result. Therefore, instead of always fetching the next sequential microinstruction, the controller fetches the most likely next microinstruction and has a better than 50% chance of preselecting the correct path.

Another prior art technique is to prefetch both paths or sequences of microinstructions and store them in a buffer. Accordingly, when the test becomes valid, the next correct microinstruction is available without delay and the incorrect path is ignored. Hardware implementation of this technique may be found for example in the IBM 3033 architecture. The implementation of this technique heretofor has utilized very expensive dual ported memories so that both paths may be simultaneously fetched. Especially for use in mini-computer CPUs and microprocessors, the commercially available dual ported memories which provide simultaneous access of two addresses are prohibitively expensive.

SUMMARY OF THE INVENTION

The invention discloses a dual fetch instruction sequencer comprising first and second means for storing program instructions wherein for each binary decision instruction having a program path choice between a jump address and a sequential address, the two choices are stored in opposite storing means, first and second address registers coupled to the respective first and second storing means, an instruction execution register coupled to the outputs of both storing means, means for loading a first address into one address register from which the instruction of the first address can be accessed, the first address corresponding to the jump address of one instruction read from either the first or second storing means into the execution register, and means for loading a second address into the opposite address register wherein the second address corresponds to the sequential address of the instruction transferred to the execution register. It may be preferable that the first and second storing means comprise single-ported memories. Also, it may be preferable that the first address loading means comprises means responsive to control signals for respectively isolating the jump address fields of the first and second storing means from both the first and second address registers. It may also be preferable that the second address loading means comprises an incrementor coupled to the output of the first address register, the incrementor having its output coupled through logic controlled isolators to the first and second address registers. Also, the sequencer may further comprise first and second means responsive to control signals for respectively isolating the outputs of the first and second storing means from the execution register. The term sequencer herein is generally defined as a device which sequentially provides the instructions of program flow to an execution register for execution. Herein, the sequencer is intended to include and be interchangeable with the term microprocessor which generally applies to microinstructions. The term instruction is intended to be interchangeable with the term microinstruction as the invention is applicable to different levels of software operation. The term sequential address is generally defined to be the default address or the direction of program flow other than to a jump or branch address. It is therefore intended to include incremental addresses by one, two, or more. Isolators or isolating means may commonly be buffers which provide a path therethrough in response to digital control logic.

The invention may also be practiced by a dual fetch instruction sequencer comprising first and second means for storing program instructions wherein for each binary decision instruction having a program path choice between a jump address and a sequential address, the jump address and sequential address are stored in different storing means, first and second address registers coupled respectively to the storing means, an execution register coupled to the outputs of the first and second storing means, means for coupling the jump address of a first instruction to the first address register in response to the first instruction being transferred to the execution register and the instruction of the jump address being located in the first storing means, means for coupling the sequential address to the second address register in response to the jump address being located in the first storing means, means for coupling the jump address of the first instruction to the second address register when the jump address is located in the second storing means, and means for coupling the sequential address to the first address register when the jump address is located in the second storing means.

The invention teaches a dual fetch microinstruction sequencer comprising a first memory for storing odd addressed microinstructions from a microprogram having opposite odd/even polarities for the two possible next addresses for each binary conditional branch microinstruction, a second memory for storing even addressed microinstructions of the microprogram, first and second address registers coupled respectively to the first and second memories, an execution register coupled to the outputs of the two memories and means responsive to the odd/even polarity of the jump address of a microinstruction transferred to the execution register for coupling a first address corresponding to the jump address to one address register from which the jump address can be accessed and for coupling a second address corresponding to the sequential address to the other address register. It may be preferable that the sequencer further comprise first and second means responsive to control signals for respectively isolating the outputs of the first and second memories from the execution register. Further, it may be preferable that the first address coupling means comprise means responsive to control signals for isolating the address fields of the first and second memories from both the first and second address registers. It may also be preferable that the second address coupling means comprise an incrementor coupled to the output of the first address register, the incrementor having its output coupled through logic controlled isolators to the first and second address registers.

The invention also discloses a dual fetch instruction sequencer having transparent overlay capability, comprising first and second memories for storing instructions from a microprogram wherein both of the next possible instructions of a conditional branch can be simultaneously prefetched, one from each memory, an execution register coupled to the outputs of the first and second memories for receiving instruction fields from either one of the first or second memories for homogeneously executing the microprogram, means for determining a microcycle when an instruction is being prefetched from only the first memory leaving the second memory available for rewriting, and means responsive to the determining means for writing a new instruction into said second memory. By overlay it is generally meant the process of rewriting instructions into a memory.

The invention teaches the method of simultaneously fetching both the jump address and the sequential address of a binary decision program instruction, comprising the steps of storing the program in a plurality of memories wherein the jump address and sequential address for each binary decision instruction are in different memories, each of the memories having a corresponding address register, reading a binary decision instruction from one of the memories into an execution register, loading a first address corresponding to the jump address of the instruction into the address register corresponding to the location of the address and loading a second address corresponding to the sequential address into the address register of the opposite memory.

BRIEF DESCRIPTION OF THE DRAWINGS

The foregoing objects and advantages will be more readily understood by reading the Description of the Preferred Embodiment with reference to the drawings wherein.

DESCRIPTION OF THE PREFERRED EMBODIMENT

Figure 1:
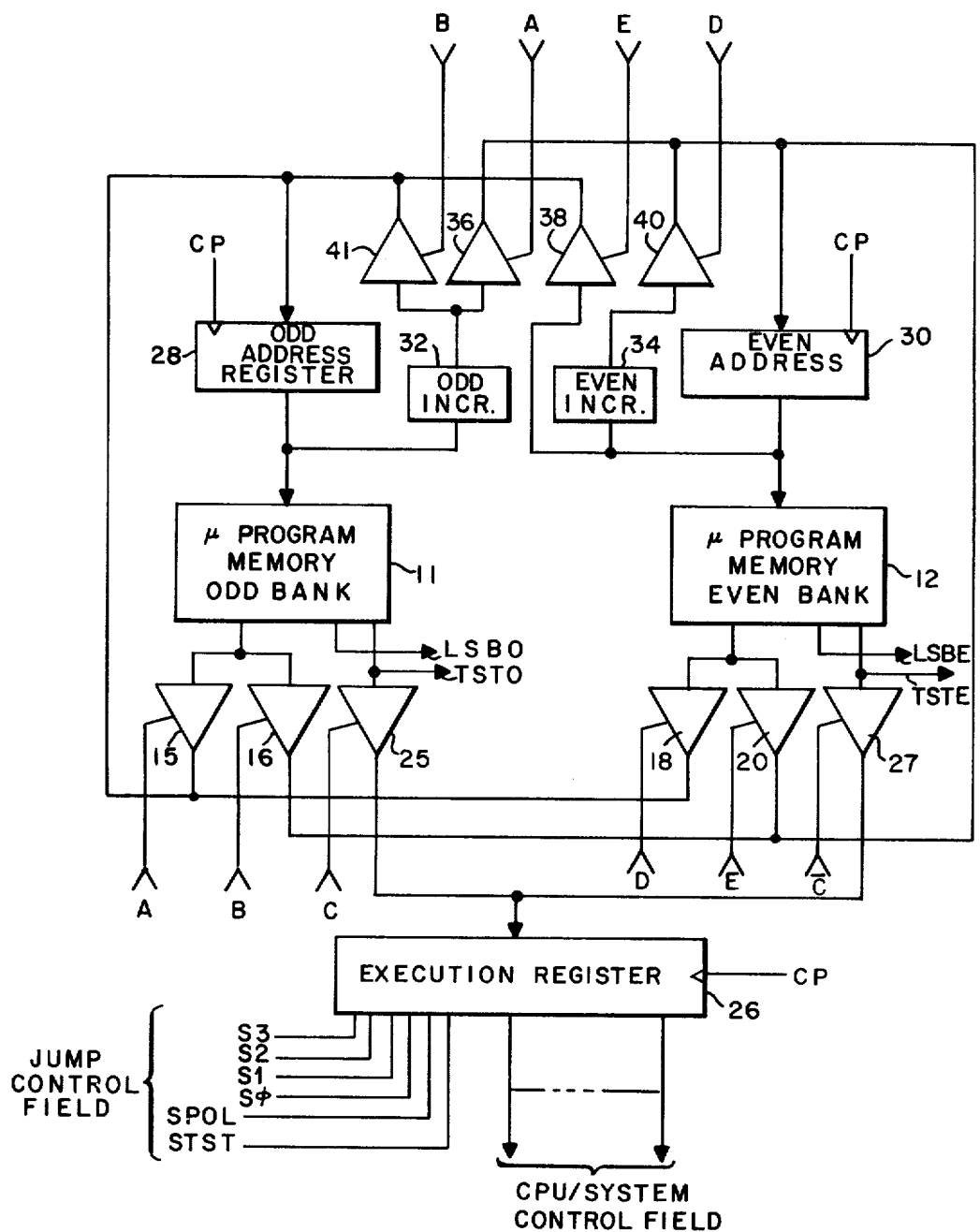
FIG. 1 is a dual fetch microsequencer embodying the invention.

Referring to FIG. 1, there is shown a logic implementation of a microsequencer control unit having a dual fetch microcache. A following detailed description of the components of FIG. 1 will be more readily understood by first providing a brief overview of the purpose and operation of the disclosed embodiments. As described earlier herein, an objective is to eliminate binary decision point fetch delays by simultaneously fetching both possible microinstructions without the use of an expensive dual ported memory. For example, referring to FIG. 2, there is shown an illustration of a typical microinstruction sequence with the labelled circles representing microinstruction addresses; each address corresponds to a microinstruction or microprogram step and these terms are used interchangaebly herein. During the execution of a microinstruction at a binary decision point (6, 7, and 22), a test is performed. Generally, if the test condition fails, the program flow continues to the next sequential address which is shown in the downard vertical direction. If, however, the test condition succeeds, the program procedes to the jump or branch address that is specified by a field in the currently executing microinstruction; jump addresses are shown in the horizontal direction. For example, if the test executed in step 6 succeeds, the next microinstruction is fetched from jump address 22 that is specified in the jump filed of step 6. If, however, the test condition in step 6 fails, the program flows to step 7 which is the next sequential address. Similarly, from step 7, the microsequence procedes to step 13 or step 8 depending on whether the test in step 7 succeeds or fails, respectively.

Figure 2:
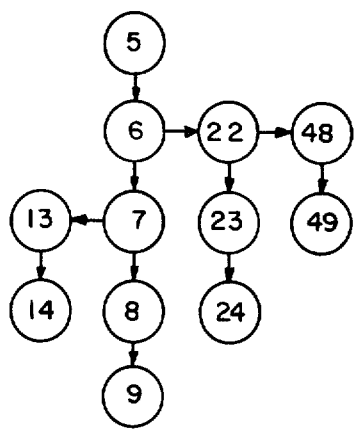
FIG. 2 is a typical microinstruction sequence.

Still referring to FIG. 2, it is observed that at each binary decision point, one of the next possible steps has an even address and the other has an odd address. More specifically, jump address for step 6 is specified to be 22 (even) while the next sequential address is 7 (odd). Also the jump address specified in step 7 is 13 and the next sequential address is 8. Further, the jump address is specified in step 22 is 48 and the next sequential address is 23. An assembler used to assign memory addresses for the microprogram will be described later herein. For the present, however, it is sufficient to note that when the jump address is even, the next sequential address is odd; also, when the jump address is odd, the next sequential address is even. Accordingly, the odd and even addressed microinstructions can be respectively segregated into two relatively inexpensive single ported memories. Both possible binary decision point addresses are generated and their respective microinstructions fetched simultaneously.

Again referring to FIG. 1, the microinstructions of the microprogram are stored in microprogram memory odd bank 11 and microprogram memory even bank 112. Although the program is homogeneous, the odd addressed microinstructions are stored in odd bank 11 and the even addressed microinstructions are stored in even bank 12. Because each jump address and the next sequential address of each binary decision point are stored in different memory banks, they can be fetched simultaneously. The typical microinstruction includes many fields which include a jump address field, jump control field, and CPU/System control field. The jump address field of odd bank 11 is connected to isolator 15 and 16 which may be, for example, type 74241 integrated circuits. The jump address field of even bank 12 is connected isolators 18 and 20. The jump control and CPU/System control fields of odd bank 11 and even bank 12 are respectively connected to isolators 25 and 27. The coupling of the respective microinstruction fields through isolators 15, 16, 25, 18, 20 and 27 are controlled by respective digital signals A, B, C, D, E, and $\overline{C}$, the generation of which will be described later herein.

Figure 3A:
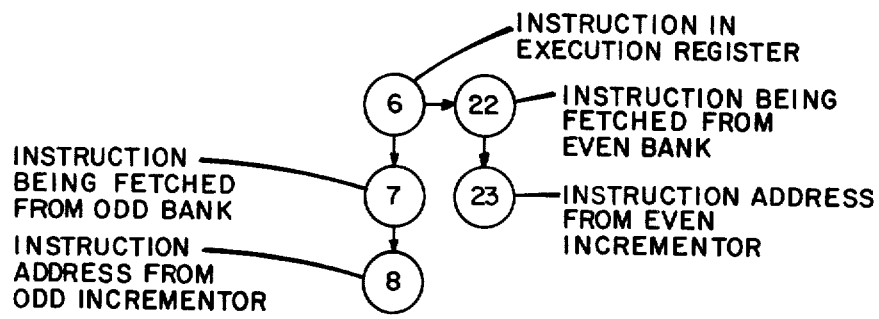
FIGS. 3A-C show alternate paths from Step 6 of FIG. 2.
Figure 3B:
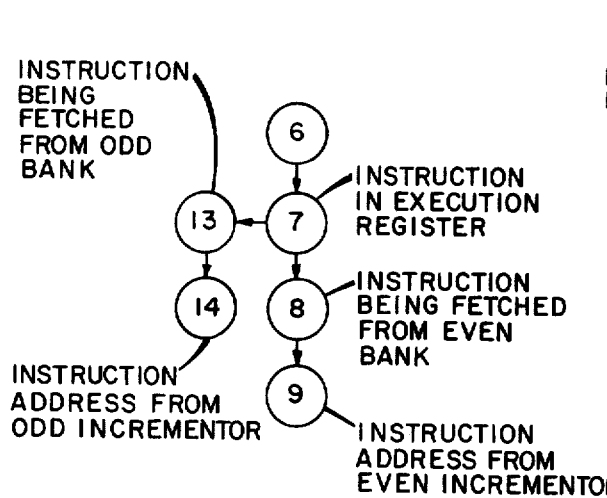

The operation of the dual fetch microcache is described with reference to FIGS. 3A-C which show alternate paths from step 6. Assume that during a first microinstruction cycle, the microinstruction corresponding to address 6 resides in execution register 26 which may preferably be a type 74374 integrated circuit. During this first cycle, the CPU/System control field is executed. This field characterizes the mechanisms of the CPU and perhaps other system components for the duration of the microcycle. The jump control field specifies the conditions that permit the program to alter its sequential flow to the jump address specified in the jump address field of the microinstruction. More specifically, the STST control bit specifies whether or not an alternate program path exists for that microinstruction. If STST is TRUE, the specified jump test may be made and an alternate path chosen if the test succeeds. Otherwise, program flow continues sequentially. When a microinstruction is not specified by STST as test and jump, its jump address field will not contain meaningful address data. However, the least significant address bit of the jump address field must always be present to steer the next sequential address because the microprogram assembler is permitted to make incremental adjustments for any microinstruction. The S0-S3 bits of the jump control field specify the condition to be tested. Usually these conditions are status bits that reflect the present condition of the system or in many instances, the result of the current microinstruction execution. The SPOL bit specifies if the condition itself is to be tested for a TRUE or FALSE state. Referring to FIG. 3A, with step 6 in execution register 26, microinstruction addresses 7 is present in odd address register 28 providing its corresponding microinstruction at the output of memory odd bank 11 and address 22 is present in even address register 30 providing its corresponding microinstruction at the output of memory even bank 12. Further, address 8 is provided at the output of odd incrementor 32 for being clocked into even address register 30 if address 7 is chosen. Also, address 23 is available at the output of even address register 30 for being clocked into odd address register 28 if address 22 is chosen. Referring to FIG. 3B, it is assumed that as a result of the test of step 6, the program path is to go to the next sequential address rather than to the jump address. Accordingly, at the end of the microcycle, clock pulse CP to odd address register 28, even address register 30 and execution register 26 initiates the following action. The jump control field and CPU/System control field of step 7 in memory odd bank 11 is transferred through isolator 25 to execution register 26 with C being TRUE (or HI or Logical 1 as used interchangeably herein). Because $\overline{C}$ as supplied to isolator 27 is FALSE, (or LO or Logical 0 as used interchangeably herein) address 22 in memory even bank 12 is discarded. In response to the least significant bit of the jump address field of memory odd blank (LSBO) as will be described later, it is determined that the jump address is odd. Accordingly, jump address 13 is transferred through isolator 15 into odd address register 28 by a TRUE A. Also, the TRUE A on isolator 36 transfers even address 8 at the output of odd incrementor 32 to even address register 30. As described earlier herein, the respective outputs of odd and even incrementors 32 and 34 correspond to steps 14 and 9.

Figure 3C:
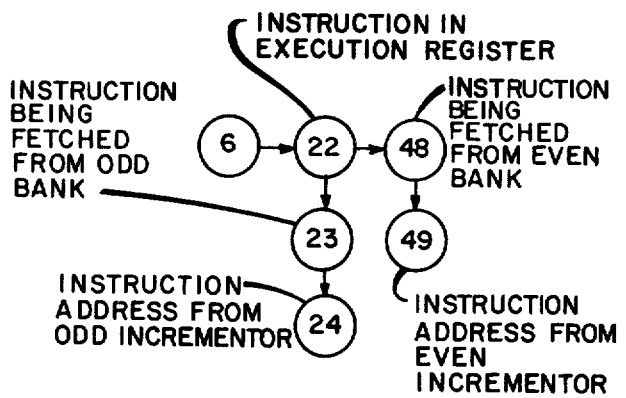

Referring to FIG. 3C, the program flow for a successfull test from FIG. 3A is shown. More specifically, jump control and CPU/System control fields of branch microinstruction 22 as specified in the jump address field of microinstruction 6 are transferred from memory even bank 12 to execution register 26 by a $\overline{C}$ signal on isolator 27. When $\overline{C}$ is TRUE, C on isolator 25 is FALSE so the path through step 7 is disregarded. Because least significant bit of memory even bank (LSBE) indicates that the jump address is even (48), the jump address is transferred through isolator 20 to even address register 30 by a TRUE E. Also, the TRUE E on isolator 38 transfers the output of even address register 30 to odd address register 28. This transfer case without going through an incrementor will be described later herein. Addresses corresponding to steps 24 and 49 will be available at the outputs of odd incrementor 32 and even incrementor 34, respectively. If LSBE had indicated that the jump address was odd, it would have been transferred through isolator 18 to odd address register 28 by a TRUE D. Accordingly, the next sequential address would have been transferred from even incrementor 34 through isolator 40 to even register 30.

In summary, at the end of a binary decision point microcycle when the test has been completed and the direction of the microprogram has been determined, the chose microinstruction is transferred into execution register 26 from either odd bank 11 or even bank 12 as determined by C or $\overline{C}$. Simultaneously, the jump address of the selected microinstruction is transferred through either isolator 15, 16, 18 or 20 to the appropriate odd or even address register 28 or 30. The next sequential address of the selected microinstruction is simultaneously transferred to the opposite odd or even address register.

Figure 4A:
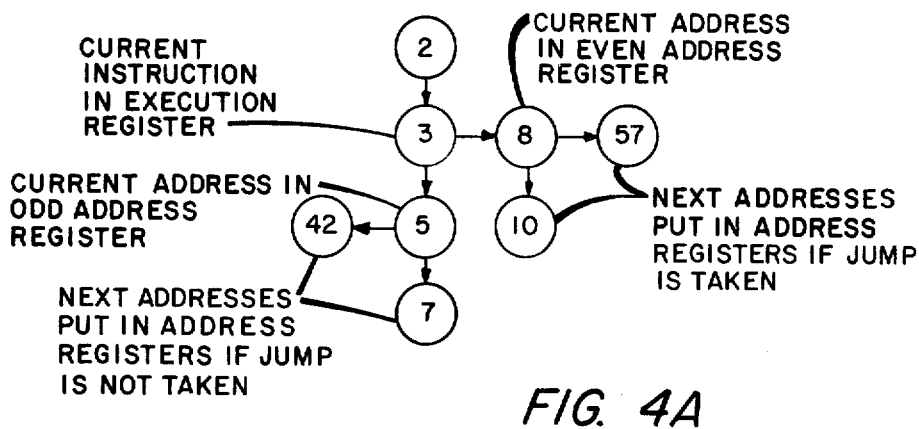
FIGS. 4A-B shows microinstruction sequences requiring double incrementing of the sequential step.

In the microprogram sequence examples of FIGS. 2 and 3A-C, the jump address in the horizontal direction at each binary decision point permitted the sequential or default address in the vertical direction to be incremented by one and still satisfy the requirement that the two paths have opposite odd/even polarities. Generally, however, that will not always be the case; as will become apparent from a description of the assembler described later herein, the sequential program steps must sometimes be separated by a value of two address increments due to the complexity of program loops. Referring to FIG. 4A, there is shown an example of a microprogram sequence wherein double increments are required for the sequential step. More specifically, in the binary decision instruction of step 3, the jump address is specified to be step 8 (even address). Therefore, the assembler has to assign a double increment or step 5 (odd address) to the next sequential address so that it and the jump address will have opposite odd/even polarities. Accordingly, they will be segregated into different memory banks and can be fetched simultaneously. A similar condition exists for the microinstruction at step 5. Its jump address is step 42 (even address), so the next sequential address is incremented by two to provide the odd address of 7. During the microcycle in which the microinstruction at address 3 is executing, even address register 30 contains address 8 and is fetching the jump instruction. Odd address register 28 contains the value 5 and is fetching the next sequential microinstruction. At the end of this microcycle, if the test results indicate that the jump is to be taken, the new jump address 57 is loaded into the odd address register and the new next sequential address 10 is loaded into the even address register. However, if the test results indicate that the jump is not to be taken, then at the end of microcycle, the new jump address 42 is loaded into the even address register and the new next sequential address 7 is loaded into the odd address register.

Figure 4B:
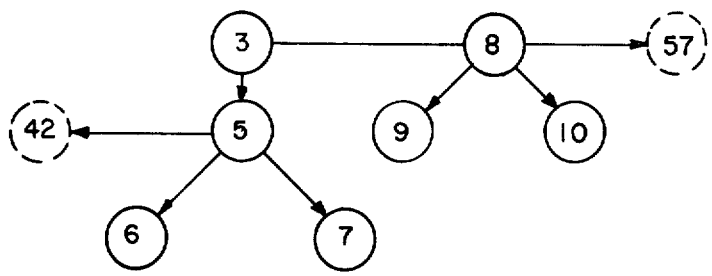

Referring to FIG. 4B, the "machine view" of the microprogram of FIG. 4A is shown at a point in time just after microinstruction 3 has been clocked into execution register 26 simultaneous to microinstruction addresses 5 and 8 being clocked into respective address registers 28 and 30. From the previous paragraphs, it is apparent that at the end of each microcycle, two instructions and four addresses must be available from which, as a result of the test results, one instruction and two addresses are selected. However, even though addresses 5 and 8 begin fetching at the beginning of the execution of the microcycle for instruction 3, the instructions for those addresses are not visible at the output of respective memory banks 10 and 12. Accordingly, for the first part of the microcycle, it is not known that the jump address for instruction 5 is even (42) and that the jump address for instruction 8 is odd (57). It follows that during the first part of the microcycle, it has not been determined whether the sequential address of instruction 5 is 6 or 7. Also, it has not been determined whether the sequential address of instruction 8 is 9 or 10. Because there may not be time in the microcycle to wait and determine if the jump address is odd or even and then increment the sequential address accordingly, the compution of the sequential address must commence immediately so that the possible sequential addresses are known and available at the end of the microcycle. The dual fetch sequencer provides look ahead capability wherein the process for computing all the possible sequential addresses (6, 7, 9 and 10) is initiated. There is no need to wait for the present jump addresses to be visible at the outputs of memory banks 11 and 12. Both the increment by one and increment by two functions can be provided for the output of odd address register 28 using odd incrementor 32. Also, both the increment by one and increment by two functions can be provided for the output of even address register 30 using even incrementor 34. Accordingly, the look ahead capability is provided by initiating the computing in odd incrementor 32 and even incrementor 34 at the beginning of the microcycle and no additional computing time is required after it is determined whether the respective dump addresses are odd or even. More specifically, if the logical address is represented by bits $A_0$-$A_N$, only bits $A_1$-$A_N$ are physically loaded into either the odd or even address registers; $A_0$, the least significant bit, is not loaded. For odd address register 28, $A_0$ is always understood to be one and for even address register 30 $A_0$ is always understood to be zero.

The physical segregation of odd and even program steps into odd and even memory banks eliminates the need for the $A_0$ bit to resolve odd or even access once it has been loaded into the correct address register. Consequently, only bits $A_1$-$A_N$ are stored in an address register and they are the only bits that have to be incremented to derive the possible sequential addresses. For example, for the logical address 0101 (5), only bits $A_1$-$A_3$ or 010 is stored in odd address register 28. Accordingly, after being incremented in odd incrementor 32, the value 011 may either be transferred through isolator 41 to odd address register 28 or through isolator 36 to even address register 30. If stored in even address register 30, the understood $A_0$ value of 0 yields an effective logic value of 0110 or 6. If, however, stored in odd address register 28, the understood $A_0$ value of 1 yields an effective logic value of 0111 or 7. Accordingly, even before it is determined that the jump address for instruction 5 is even (42), the value of 011 can be computed by odd incrementor 32 from which either possible sequential address can be derived without further computing time merely by transferring it to the appropriate address register. In short, the process for generating the sequential addresses can be commenced before it is known whether the jump address is odd or even. Similarly, for the logical address 1000 (8), only bits $A_1$-$A_3$ or 100 is stored in even address register 30. If 100 is destined for odd address register 28 through isolator 38, it is not incremented resulting in the effective logical value of 1001 (9) with an understood $A_0$ of 1. If however, 100 is destined for even register 30 through isolator 40, it is first incremented to 101 by even incrementor 34. Accordingly, the effective stored value is 1010 (10) with the understood value of 0 for $A_0$.

Figure 5:
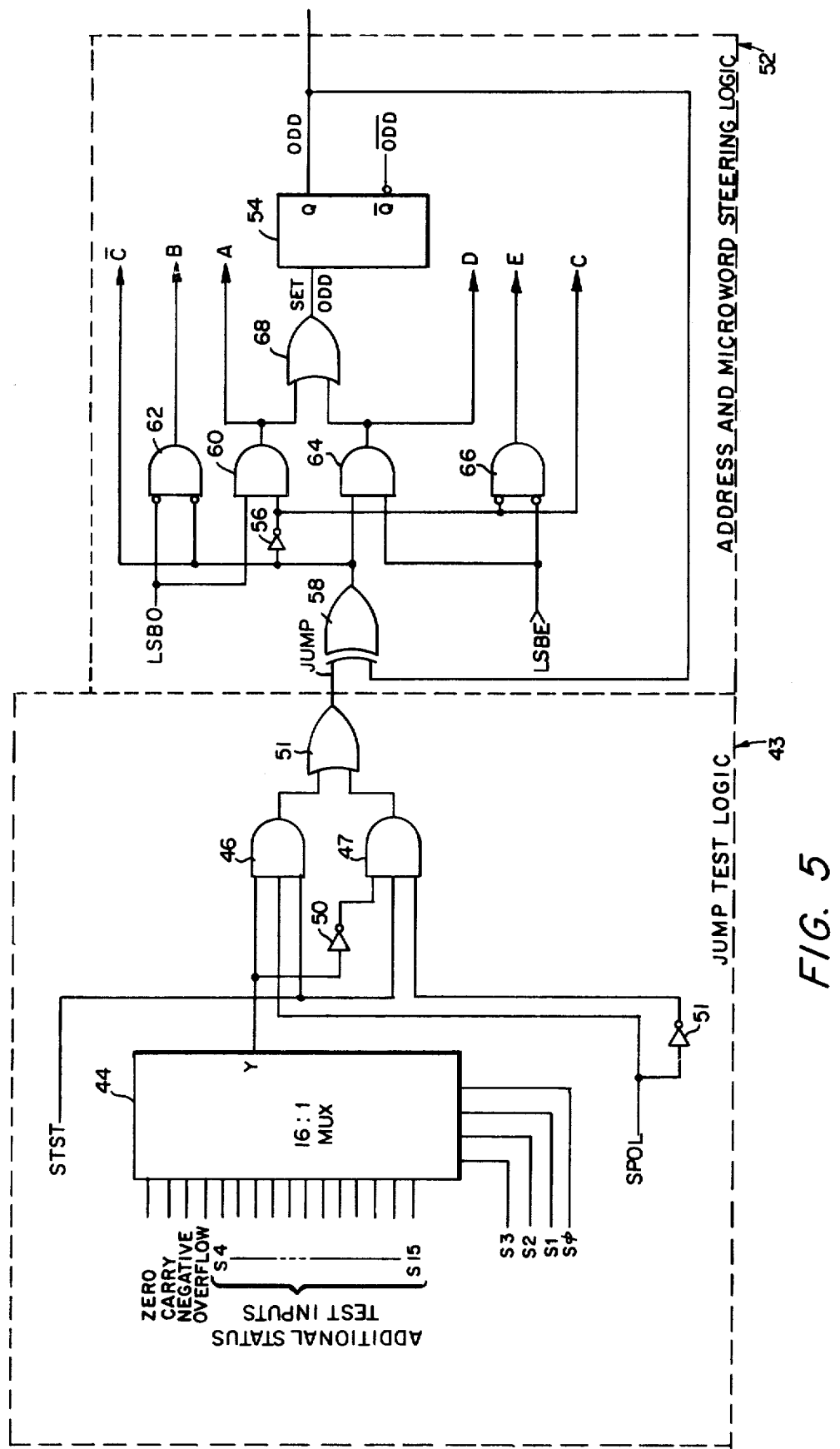
FIG. 5 is a logical implementation of the jump control mechanism.

Referring to FIG. 5, there is shown a logical implementation of the jump control mechanism which generates logical control signals A, B, C, $\overline{C}$, D, and E which were described earlier herein. In the jump test logic 43, input bits S0-S3 from the jump control field of the microinstruction in execution register 26 selects which status condition at the input of multiplexer MUX 44 is coupled to output Y. Example status conditions at the input of MUX 44 are shown as ZERO, CARRY, NEGATIVE, OVERFLOW, ETC. An example of MUX 44 is a type 74150 integrated circuit. The selected status condition at MUX 44 output Y on which the binary decision point test depends is coupled to AND gate 46. The status condition is inverted by inverter 50 and coupled to AND gate 47. Control bit STST is coupled from the jump control field of the microinstruction in execution register 26 to AND gate 46 and 47. As described earlier herein, if STST is TRUE (logical 1) the jump test may be made and the alternate path (jump address) chosen if the test is TRUE. Control bit SPOL is coupled from the jump control field of the microinstruction in instruction register 26 to AND gate 46. SPOL is inverted by inverter 51 and is coupled AND gate 47. SPOL indicates on which polarity of the status condition the alternate path or jump is to be chosen. Accordingly, a logical 1 is provided at the output of AND gate 46 if and only if STST is a logical 1, SPOL is a logical 1, and the selected status condition is a logical 1. A logical 1 is provided at the output of AND gate 48 if and only if STST is a logical 1, SPOL is a logical 0, and the selected status condition is a logical 0. A logical 1 at the output of AND gate 46 or AND gate 47 provides a JUMP signal (logical 1) at the output of OR gate 51.

The JUMP signal is coupled to the Address and Microword Steering logic 52 where it is gated with signals LSBO, LSBE, and ODD. LSBO and LSBE are the least significant address bits of the address fields of the addressed microinstructions of odd bank 11 and even bank 12, respectively. ODD is the Q output of flip flop 54 and denotes in which address register the current jump address resides. More specifically, if ODD is TRUE, the current jump address is in odd address register 28. If ODD is FALSE, the current jump address is in even register 30.

As shown in FIG. 5, the equations for the logical control bits are as follows:

$$A = \overline{[JUMP \oplus ODD]} \cdot LSBO$$

$$B = \overline{[JUMP \oplus ODD]} \cdot \overline{LSBO}$$

$$C = \overline{JUMP \oplus ODD}$$

$$\overline{C} = JUMP \oplus ODD$$

$$D = [JUMP \oplus ODD] \cdot LSBE$$

$$E = [JUMP \oplus ODD] \cdot \overline{LSBE}$$

The derivation of these equations will be explained. Referring to FIG. 1, C must be True to transfer the jump control and CPU/System control fields of memory odd bank 11 to execution register 26 if the jump address has been chosen and it resides in odd bank 11 (JUMP·ODD) or if the sequential address has been chosen and the jump address resides in even bank 12 (JUMP·ODD). This condition is satisfied by the complement of the EXCLUSIVE OR of JUMP and ODD ($\overline{JUMP \oplus ODD}$). Referring to FIG. 5, C is TRUE if the input of inverter 56 is FALSE. The input to inverter 56 is FALSE if the inputs (JUMP and ODD) to EXCLUSIVE OR gate 58 are both TRUE or both FALSE.

The difference between C and $\overline{C}$ is inverter 56 so one is TRUE, and the other is FALSE. Accordingly, at clock pulse CP, the jump control and CPU/System control fields of either odd bank 11 or even bank 12 are clocked through respective isolators 25 or 27 into execution register 26. Again, referring to FIG. 1, A must be TRUE is C is TRUE ($\overline{JUMP \oplus ODD}$) and the least significant bit of the jump address field of odd bank 11 is odd [$\overline{(JUMP \oplus ODD)} \cdot LSBO$]. Accordingly, control bit A channels the odd jump address from odd bank 11 into odd address 28. Control bit A also channels the sequential address through isolator 36 into even address register 30. Referring to FIG. 5, A is the output of AND gate 60 and it is TRUE if C and LSBO are both TRUE. Again, referring to FIG. 1, B must be TRUE if C is TRUE ($\overline{JUMP \oplus ODD}$) and LSBO is FALSE. Accordingly, B transfers the even jump address through isolator 16 to even address register 30 and the odd sequential address through isolator 41 to odd address register 28. Referring to FIG. 5, B is the output of AND gate 62 and it is TRUE if C is TRUE (actually $\overline{C}$ is FALSE) and LSBO is FALSE.

Referring to FIG. 1, D must be TRUE if $\overline{C}$ is TRUE (JUMP⊕ODD) and the least significant bit of the jump address field of even bank 12 is odd ([JUMP⊕ODD]·LSBE). Accordingly, D transfers the jump address through isolator 18 to odd address register 28 and the sequential address through isolator 40 to even address register 30. Referring to FIG. 5, D is the output of AND gate 64 and is TRUE if $\overline{C}$ and LSBE are TRUE. Again, referring to FIG. 1, E msut be TRUE if $\overline{C}$ is TRUE and the least significant bit of the jump address field of even bank 12 is even ([JUMP⊕ODD]·$\overline{LSBE}$). Accordingly, E transfers the jump address from even bank 12 through isolator 20 to even address register 30; E also transfers the sequential address through isolator 38 to odd address register 28. Referring to FIG. 5, E is the output of AND gate 66 and is TRUE when C is FALSE (actually $\overline{C}$ is TRUE) and LSBE is FALSE. In summary, for each microcycle, either C or $\overline{C}$ is TRUE so that the jump control and CPU/System control fields of either odd bank 11 or even bank 12 are transferred to execution register 26. If the microinstruction in odd bank 11 is selected, either A or B is TRUE so that the jump address is transferred to the appropriate address register 28 or 30; this is a function of LSBO. The A or B that is TRUE also transfers the sequential address into the opposite address register 28 or 30. Similarly, if the microinstruction in even bank 12 is selected, either D or E is TRUE so that the jump address is transferred to the appropriate address register 28 or 30; this is a function of LSBE. The D or E that is TRUE also transfers the sequential address into the opposite address register 28 or 30.

Again, referring to FIG. 5, flip flop 54, as stated earlier herein, denotes in which address register 28 or 30 the jump address resides; if ODD is TRUE, the jump address is in odd address register 28. Accoringly, flip flop 54 must be set at the end of a microcycle when the jump address field from either memory bank 11 or 12 is loaded into odd address register 28. The equation for this is given below:

$$SET\ ODD = A + D$$

This is satisfied by A and D being inputs to OR gate 68.

Figure 6:
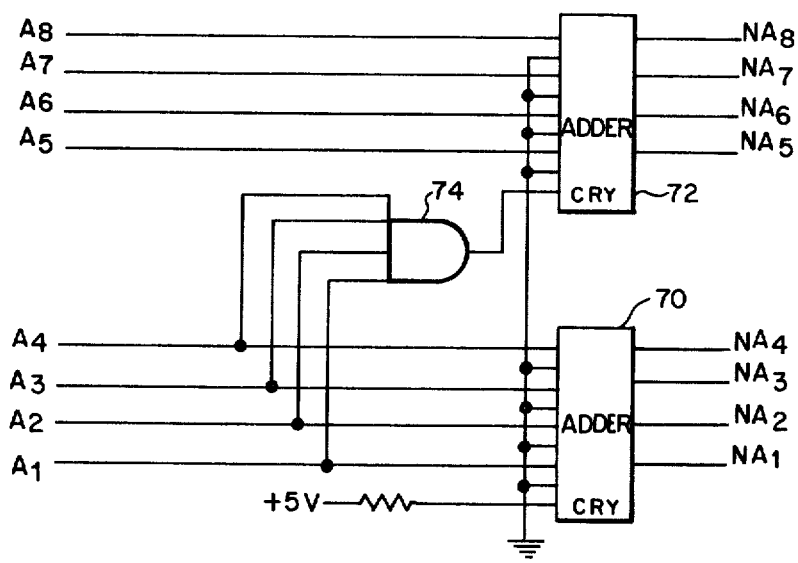
FIG. 6 is the incrementor of FIG. 1.

Referring to FIG. 6, there is shown a logic implementation of incrementor INCR 32 or 34. The function is to increment by one the input address bits $A_1-A_8$ to provide the effective sequential address $NA_1-NA_8$. Adders 70 and 72 may preferably by type 74283 integrated circuits. AND gate 74 may provide a look ahead carry (CRY) to adder 72 to speed up the increment function.

Figure 7:
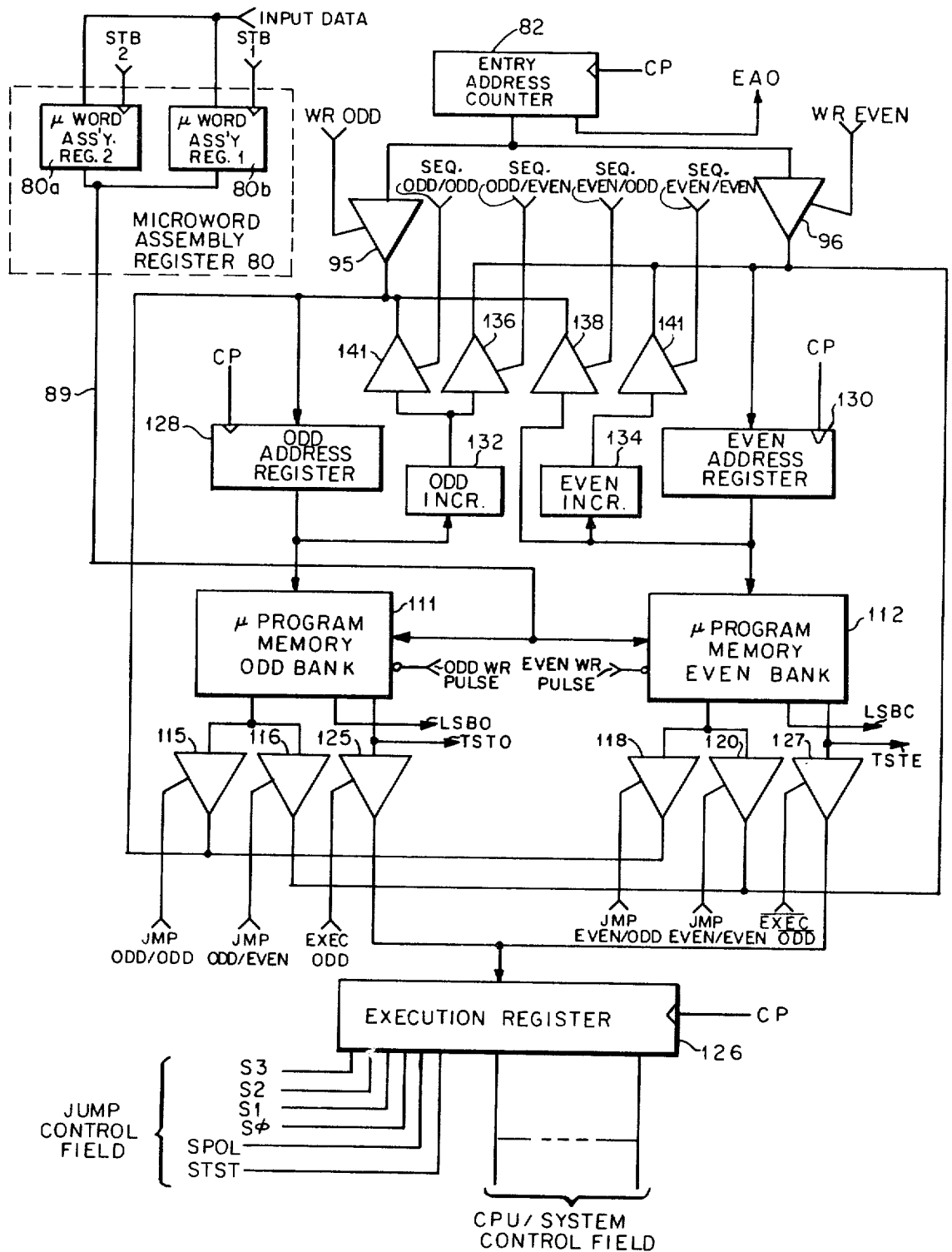
FIG. 7 is a alternate embodiment of the microsequencer of FIG. 1 including overlay capability.

Referring to FIG. 7, there is shown an alternate embodiment of the microsequencer of FIG. 1. Much of the embodiment of FIG. 7 is identical to the embodiment of FIG. 1. A prefix of "1" has been added to the identifying numerals of the common components which operate in the same manner as FIG. 1. For example, memory odd bank 11 of FIG. 1 corresponds to memory odd bank 111 of FIG. 7 and isolator 15 of FIG. 1 corresponds to isolator 115 of FIG. 7. The components added to FIG. 7 provide the ability to alter dynamically the contents of the microprogram memory. As is well known to those skilled in the art, some microsequencer mechanisms such as those used in array processors involve the execution of a relatively large number of microprogram routines that require storage capacity far in excess of the commonly used microprogram memories. This requirement can theoretically be satisfied by using a very large microprogram memory but this solution is expensive. Another approach is to use a standard sized microprogram memory and periodically rewrite its contents from external storage such as a math routine library; this process is commonly referred to as overlay. With prior art sequencer mechanisms, however, the microprogram execution must be periodically suspended to write new microinstructions into the microprogram memory because of the inability to simultaneously read from and write to the same single-ported memory. However, using two microprogram memories as described herein, the overlay process can be performed in one memory simultaneous to program execution in the other memory. In other words, the partitioning of the microprogram into two memory banks in accordance with the invention provides overlay capability without interrupting normal microprogram execution. Furthermore, the use of two memories appears transparent for both execution and overlay. More specifically, for microinstructions that do not specify a test and jump condition (STST is FALSE), only one valid microinstruction is prefetched; accordingly, during the execution of these microinstructions, one memory bank is available for dynamic update.

Still referring to FIG. 7, the two basic components that are added to the dual fetch microsequencer as shown in FIG. 1 to provide the capability of dynamic program entry or overlay are microword assembly register 80 and entry address counter 82. Microinstructions or microwords are generally much wider than standard storage memories. Accordingly, microword assembly register 80 allows wide microwords to be assembled in fragments from standard length bytes so that the entire microword can collectively be written in parallel into a microprogram memory bank 111 or 112. Microprogram assembly reigster 80 may comprise one or more registers, the sum of their widths being equal to or greater than the width of a microword or microinstruction. As shown in FIG. 7, microword assembly register 80 comprises assembly registers 80a and 80b which may preferably be type 74374 integrated circuits.

Some of the steering logic for FIG. 7 with overlay capability must be different than the logic described with reference to FIG. 1 so as to prevent the jump address isolators from being enabled when there is no jump address (TSTO or TSTE is FALSE). This ensures that the appropriate microprogram bank 111 or 112 is available for being written. The equations for the control signals for FIG. 7 are given in the Appendix. These equations could be implemented in logic similar to that described with reference to FIG. 5. However, as will be appreciated by those skilled in the art, it may preferable to satisfy the Appendix equations using a programmable logic array thereby reducing the number of levels of logic gates. More specifically, in analyzing performance, one factor to be considered is the propagation delay through various logic mechanisms that control the loading of execution register 126 and address registers 128 and 130. For example, as shown in FIG. 5, the selected status bit determines the final state of JUMP signal and therefore determines the final state of control signals A, B, C, C̄, D, and E. It also has the longest delay path with a minimum of six gate delays. In many cases, the selected status bit will be present at the beginning of the microcycle and this amount of delay may not be critical. However, in many other cases, the jump test will depend on the results of the currently executing cycle such as, for example, the status bit being the carry or overflow bit from an arithmetic logic unit. This circumstance is the most critical because the dual fetch sequencer as described requires that all jump test and steering functions be resolved before the microcycle ends so that clock CP will strobe the appropriate addresses into the address registers and the selected microinstruction into the execution register. It follows that in some applications it may be preferable, if not necessary, that the number of levels of gates be reduced from that shown in FIG. 5 by such technique as a programmable logic array. The task of providing a programmable logic array to provide the control signals for FIG. 7 from the equations of the Appendix is well known to those skilled in the art.

The terms of the equations of the Appendix will now be defined; some of these definitions were given earlier herein with reference to FIG. 1. EXEC ODD when TRUE causes the jump address and CPU/System control fields of the microinstruction in odd memory bank 128 to be loaded into execution register 126 thru isolator 125 at clock CP. When this term is FALSE, these respective fields are loaded from memory even bank 112 through isolator 127. JMP ODD/ODD when TRUE causes the jump address field of the microinstruction in odd memory bank 111 to be loaded into odd address register 128. JMP ODD/EVEN when TRUE causes the jump address field from the microinstruction in odd memory bank 111 to be loaded into even address register 130. JMP EVEN/ODD when TRUE causes the jump address field from the microinstruction in even memory bank 112 to be loaded into odd address register 128. JMP EVEN/EVEN when TRUE causes the jump address field of the microinstruction in even memory bank 112 to be loaded into even address register 130. SEQ ODD/ODD when TRUE causes the incremented value of the address in odd address register 128 to be loaded into odd address register 128. SEQ ODD/EVEN when TRUE causes the incremented value of the address in odd address register 128 to be loaded into even address register 130. SEQ EVEN/ODD when TRUE causes the value of the address in even address register 130 to be loaded into odd address register 128 without being incremented. SEQ EVEN/EVEN when TRUE causes the incremented value of the address in even address register 130 to be loaded into even address register 130. WR ODD when TRUE causes the value in entry address counter 82 to be loaded into odd address register 128. WR EVEN when TRUE causes the value in the entry address counter 82 to be loaded into even address register 130. SET ODD when TRUE causes the ODD flip flop corresponding to flip flop 54 of FIG. 5 to be set. When this term is FALSE, it causes the ODD flip flop to be reset. ODD is the TRUE state output of the ODD flip flop. When it is TRUE, it denotes that the jump address field of the currently executing microinstruction is in odd address register 128 and even through the current microinstruction does not specify a jump address, it always denotes that the next sequential address is currently in even address register 130. When ODD is FALSE, it denotes that the next sequential address is currently in odd address register 128. LSBO is the least significant bit ($A_0$) of the jump address field of the microinstruction that is output from odd memory bank 111. When LSBO is TRUE, it denotes that the jump address is an odd address. When LSBO is FALSE, it denotes the jump address is an even address. LSBE is the least significant bit ($A_0$) of the jump address field in the microinstruction that is output from even memory bank 130. When LSBE is TRUE, it denotes that the jump address for that microinstruction is an odd address. When LSBE is FALSE, it denotes that the jump address is an even address. TSTO is a bit in the jump control field of the microinstruction that is output from odd memory bank 111. When TSTO is TRUE, it denotes that the jump address and the remaining bits of the jump control field are valid. When TSTO is FALSE, it indicates that these fields do not contain the jump address and control function. The LSBO signal is valid regardless of the state of TSTO. TSTE is a bit in the jump control field of the microinstruction that is output from even memory bank 112. When TSTE is TRUE, it denotes that the jump address and the remaining bits of the jump control field are valid. When TSTE is FALSE, it indicates that these fields do not contain the jump address and control functions. The LSBE signal is valid regardless of the state of TSTE. STST is an output of execution register 126. It is the value of the TSTO or TSTE terms from the previous microcycle depending on whether the execution register was loaded from the odd or even memory bank, respectively. When STST is TRUE, it permits the jump address test to be made. When STST is FALSE, it disables this test and causes the microinstruction that is fetched from the next sequential address to be loaded into the execution register at the completion of the current instruction cycle. SPOL is an output of the execution register 126. It is a bit in the jump control field. When SPOL is TRUE, it indicates that the status bit for the jump test must be TRUE in order for the program jump to occur. When SPOL is FALSE, the status bit for the jump test must be FALSE to initiate a program jump. S0–S3 are status select bits in the jump control field and are output from execution register 126. Collectively, these four bits specify one of sixteen status conditions that is used to resolve the jump test. STATUS is a minterm whose equation is derived from the prime terms SPOL, S0, S1, S2 S3, and the status bit specified by S0–S3 (status bit Z used as example in equations). It is used only for the convenience of notating the equations in the Appendix.

Still referring to FIG. 7, a logical process which is external to the dual fetch microsequencer initializes the memory overlay logic by loading a starting address into entry address counter 82 which may preferably be a type 74163 integrated circuit. This external logic is not shown herein but would be a well known design to those skilled in the art. The external logic would then fetch the byte or word fragments that jointly compose the microinstruction corresponding to the address in entry address counter 82. STB1 and STB2 control signals are produced by the external logic and are used to correctly load the bytes or word fragments into microword assembly registers 80a and 80b. When the microinstruction is fully assembled, the external overlay mechanism provides a DATA RDY signal.

Figure 8:
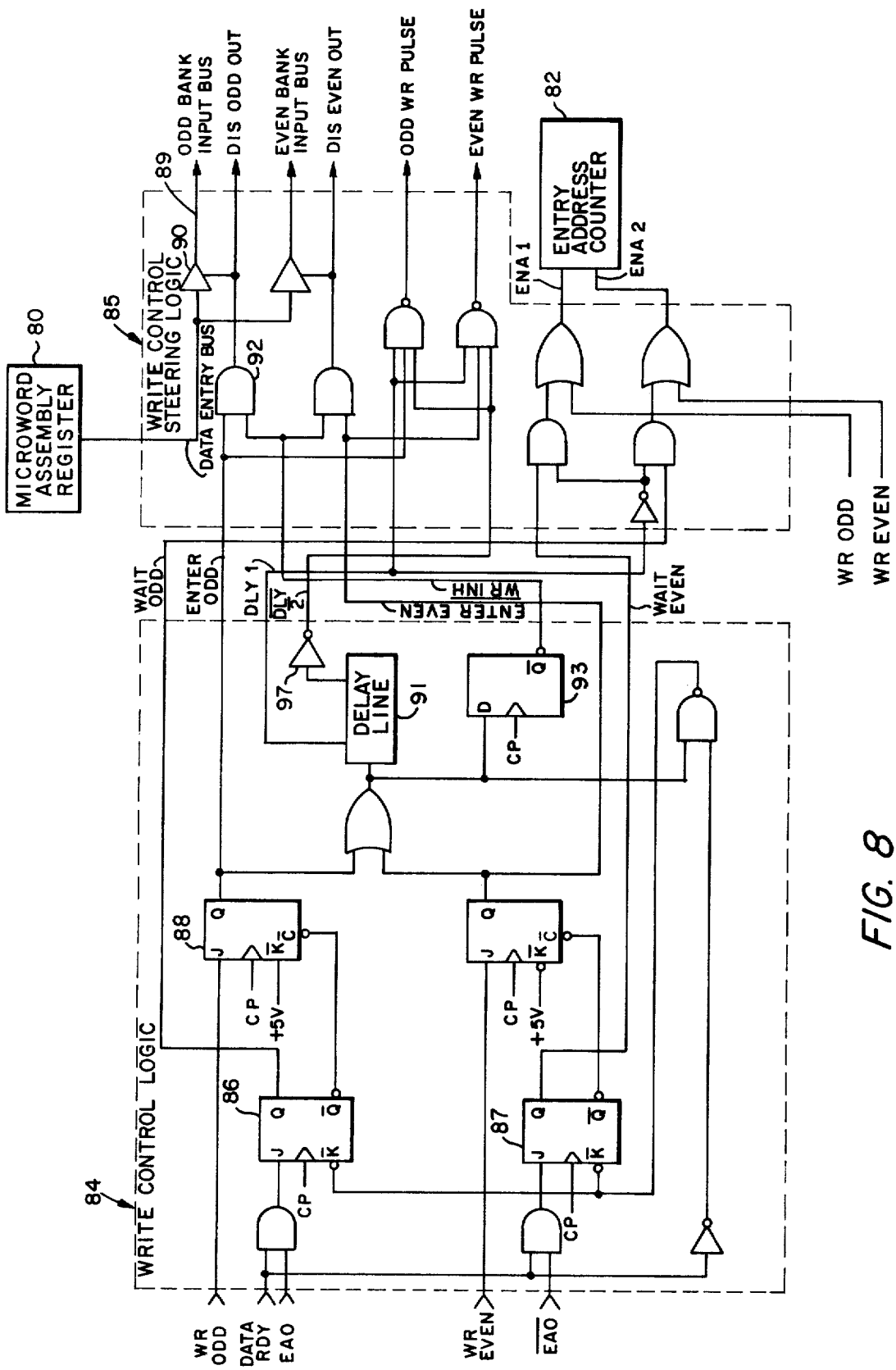
FIG. 8 is the write control and write control steering logic for the embodiment of FIG. 7.

Referring to FIG. 8, write control logic 84 and write control steering logic 85 used to provide control signals for the embodiment of FIG. 7 during the overlay process are shown. One of the inputs to write control logic 84 is DATA RDY which, as defined earlier herein, indicates that the microinstruction is fully composed in microword assembly register 80 and therefore, the overlay process from an external viewpoint may commence. EA0 is the least significant bit of the contents of entry address counter 82. Accordingly, EA0 specifies whether the address is odd (TRUE) or even (FALSE). EA0 is used to steer the overlay data to the proper memory bank 111 or 112. More specifically, with DATA RDY, either WAIT ODD flip flop 86 or WAIT EVEN flip flop 87 will be set depending on the state of EA0. The WAIT ODD and WAIT EVEN signals assure that a write operation will only take place when the appropriate memory bank is available for a write cycle. Input signals WR ODD and WR EVEN are defined by equations in the Appendix and generally indicate an opportunity by the microsequencer to write into the respective memory banks 111 or 112. Although an address will be loaded into either odd address register 128 or even address register 130 through respective isolators 95 or 96 when an available cycle occurs as indicated by WR ODD or WR EVEN, the write operation to a respective microprogram memory bank 111 or 112 will only occur with a DATA RDY. The logic for writing into even bank 112 is similar to that for writing into odd bank 111 so only the odd write will be described herein. If WAIT ODD flip flop 86 is set and WR ODD signal is TRUE, the contents of entry address counter 82 are loaded into odd address register 128 and then the counter value is incremented to the next sequential address (even). ENTER ODD flip flop 88 is set at the beginning of the write cycle to control the write functions to microprogram memory odd bank 111 while allowing even bank 112 to perform its normal instruction prefetch operation. ENTER ODD enables the contents of microword assembly register 80 through isolator 90 onto data input bus 89 of memory odd bank 111 and, if necessary, uses DIS ODD OUT to disable the output function of odd bank 111. Further into the write cycle after time for the address and data to stabilize, an appropriately finite ODD WR pulse is provided to memory odd bank 111 to enter the microword. As shown, the negative ODD WR pulse is provided by the AND of ENTER ODD, DLY1, and $\overline{DLY2}$ such that the duration of the pulse is a function of delay line 91 and the time required to propagate a logical 1 to the input of inverter 97.

In addition to ENTER ODD, AND gate 92 requires $\overline{WR\ INH}$ to enable isloator 90. $\overline{WR\ INH}$ is initially provided by flip flop 93 but at the completion of the write cycle, flip flop 93 will be set to provide the function of preventing a repeat write without a new DATA RDY.

As described earlier herein, the odd addressed microinstructions are stored in microprogram memory odd bank 11 or 111 and the even addressed microinstructions are stored in microprogram memory even bank 12 or 112. Further, the assembled microprogram is arranged so that the two possible microinstructions at a binary decision point reside in different memory banks so that both may be fetched simultaneously. Accordingly, the assembler must provide that if the jump address is odd, the sequential address is even; further, if the jump address is even, the sequential address is odd. The task of providing an assembler meeting these basic requirements could be performed by one skilled in the art. The following rules specify one method for creating an assembler that would manipulate the address assignments in accordance with the invention.

A backward jump to a preassigned address that is even will cause the next sequential microinstruction address to be odd. In contrast, a backward jump to a preassigned address that is odd will cause the next sequential microinstruction address to be even. If the present microinstruction address is one odd/even polarity and the sequential microinstruction address is to be the other, the sequential address is created by incrementing the present address by one. If the present microinstruction address is one odd/even polarity and the next sequential address is to be the same, the sequential address is derived by incrementing the present address by two.

First time jumps to a forward reference are assigned as only odd if the next sequential instruction is even. In contrast, first time jumps to a forward reference are assigned as only even if the next sequential microinstruction address is odd.

Subsequent jumps to a forward reference will cause the next sequential microinstruction address to be odd if the forward reference was previously characterized as even. In contrast, a subsequent jump to a forward reference will cause the next sequential microinstruction address to be even if the forward reference was previously characterized as odd. If the present microinstruction address being assembled is the same odd/even polarity as the sequential addreess is to be, the increment value will be by two instead of one.

In the case where the sequential instruction was previously forward referenced as even and the above rules dictate that the next sequential address instruction should be odd because it makes a backward reference to an even address, the backward referenced address should be changed to an odd address by double incrementing the first address preceding that backward reference that is not referenced. In contrast, in the case where the sequential instruction was previously forward referenced as odd and the above rules dicate that the sequential instruction should be even because it makes a backward reference to an odd address, the backward referenced address should be changed to an even address by double incrementing the first address preceding that backward reference that is not referenced. This case will only arise when the sequential instruction after a backward reference is also a forward reference destination.

This completes the description of the Preferred Embodiment. The reading of it by those skilled in the art will bring to mind many alterations and modifications without departing from the spirit and scope of the invention. Accordingly, it is intended that the scope of the invention be limited only by the appended claims.

APPENDIX

EQUATIONS FOR FIG. 7 CONTROL SIGNALS

JUMP ODD TO ODD = STATUS . STST . TSTO . ODD . LSBO
+ $\overline{STST}$ . TSTO . LSBO . $\overline{ODD}$
+ $\overline{STATUS}$ . TSTO . LSBO . $\overline{ODD}$ STATUS = Z . $\overline{S0}$ . $\overline{S1}$ . $\overline{S2}$ . $\overline{S3}$ . SPOL
+ $\overline{Z}$ . $\overline{S0}$ . $\overline{S1}$ . $\overline{S2}$ . $\overline{S3}$ . $\overline{SPOL}$ $\overline{STATUS}$ = Z . $\overline{S0}$ . $\overline{S1}$ . $\overline{S2}$ . $\overline{S3}$ . $\overline{SPOL}$
+ $\overline{Z}$ . $\overline{S0}$ . $\overline{S1}$ . $\overline{S2}$ . $\overline{S3}$ . SPOL JUMP ODD TO EVEN = STATUS . STST . TSTO . ODD . $\overline{LSBO}$
+ $\overline{STST}$ . TSTO . $\overline{ODD}$ . $\overline{LSBO}$
+ $\overline{STATUS}$ . TSTO . $\overline{ODD}$ . $\overline{LSBO}$ JUMP EVEN TO ODD = STATUS . STST . TSTE . $\overline{ODD}$ . LSBE
+ $\overline{STST}$ . TSTE . ODD . LSBE
+ $\overline{STATUS}$ . TSTE . ODD . LSBE

APPENDIX-continued
EQUATIONS FOR FIG. 7 CONTROL SIGNALS

JUMP EVEN TO EVEN = STATUS . STST . TSTE . $\overline{ODD}$ . $\overline{LSBE}$
+ $\overline{STST}$ . TSTE . ODD . $\overline{LSBE}$
+ $\overline{STATUS}$ . TSTE . ODD . $\overline{LSBE}$ SEQ ODD TO EVEN = STATUS . STST . ODD . LSBO
+ $\overline{STST}$ . $\overline{ODD}$ . LSBO
+ $\overline{STATUS}$ . $\overline{ODD}$ . LSBO SEQ ODD TO ODD = STATUS . STST . ODD . $\overline{LSBO}$
+ $\overline{STST}$ . $\overline{ODD}$ . $\overline{LSBO}$
+ $\overline{STATUS}$ . $\overline{ODD}$ . $\overline{LSBO}$ SEQ EVEN TO EVEN = STATUS . STST . $\overline{ODD}$ . LSBE
+ $\overline{STST}$ . ODD . LSBE
+ $\overline{STATUS}$ . ODD . LSBE SEQ EVEN TO ODD = STATUS . STST . $\overline{ODD}$ . $\overline{LSBE}$
+ $\overline{STST}$ . ODD . $\overline{LSBE}$
+ $\overline{STATUS}$ . ODD . $\overline{LSBE}$ EXEC ODD = STATUS . STST . ODD
+ $\overline{STATUS}$ . $\overline{ODD}$
+ $\overline{STST}$ . $\overline{ODD}$

SET ODD = (SEQ ODD TO EVEN)
+ (SEQ EVEN TO EVEN)

WR EVEN = $\overline{TSTE}$ . $\overline{ODD}$ . $\overline{LSBE}$ . STATUS . STST
+ $\overline{TSTE}$ . ODD . $\overline{LSBE}$ . $\overline{STATUS}$
+ $\overline{TSTE}$ . ODD . $\overline{LSBE}$ . $\overline{STST}$
+ $\overline{TSTO}$ . ODD . $\overline{LSBO}$ . STATUS . STST
+ $\overline{TSTO}$ . $\overline{ODD}$ . $\overline{LSBO}$ . $\overline{STATUS}$
+ $\overline{TSTO}$ . $\overline{ODD}$ . $\overline{LSBO}$ . $\overline{STST}$ WR ODD = $\overline{TSTE}$ . $\overline{ODD}$ . LSBE . STATUS . STST
+ $\overline{TSTE}$ . ODD . LSBE . $\overline{STATUS}$
+ $\overline{TSTE}$ . ODD . LSBE . $\overline{STST}$
+ $\overline{TSTO}$ . ODD . LSBO . STATUS . STST
+ $\overline{TSTO}$ . $\overline{ODD}$ . LSBO . $\overline{STATUS}$
+ $\overline{TSTO}$ . $\overline{ODD}$ . LSBO . $\overline{STST}$

What is claimed is:
1. A dual fetch instruction sequencer comprising:

first and second memories for storing instructions from a homogeneous program wherein for each binary decision instruction having a program path choice between a jump address specified in a field of each of said binary decision instructions and a next sequential address, the instruction specified by the jump address and the instruction of the next sequential address are stored in opposite ones of said first and second memories;

a first address register connected to said first memory for addressing instructions therein;

a second address register connected to said second memory for addressing instructions therein;

an execution register for executing said program instructions;

means for selectively loading an addressed instruction from said first or second memories into said execution register;

means for loading the jump address specified by a binary decision instruction loaded into said execution register into the address register of said first and second address registers that is connected to the memory of said first and second memories that is storing the jump instruction of said binary decision instruction loaded into said execution register;

means for generating the next sequential address of said binary decision instruction loaded into said execution register and for loading said next sequential address into the address register of said first and second address registers that is connected to the memory of said first and second memories that is storing the next sequential instruction of said binary decision instruction loaded into said execution register; and the loading of said first and second registers with said jump address and said next sequential address of said binary decision instruction loaded into said execution register being simultaneous wherein said jump instruction and said next sequential instruction are simultaneously prefetched from said first and second memories.

2. The sequencer recited in claim 1 wherein said first and second memories are single-ported.

3. A dual fetch instruction sequencer comprising:

first and second memories for storing instructions from a homogeneous program wherein for each binary decision instruction having a program path choice between a jump address specified in a field of each of said binary decision instructions and a next sequential address, the instruction specified by the jump address and the instruction of the next sequential address are stored in opposite ones of said first and second memories;

a first address register connected to said first memory for addressing instructions therein;

a second address register connected to said second memory for addressing instructions therein;

an execution register for executing said program instructions;

means for selectively loading an addressed instruction from said first or second memories into said execution register;

means for loading the jump address specified by a first binary decision instruction in said first memory into said first address register in response to said first instruction being transferred to said execution register and the addressed location of said jump address of said first instruction being in said first memory;

means for generating the sequential address of said first instruction and for loading it into said second address register in response to said first instruction being transferred to said execution register and the addressed location of said jump address of said first instruction being in said first memory;

means for loading the jump address specified by said first instruction into said second address register in response to said first instruction being transferred to said execution register and the addressed location of said jump address of said first instruction being in said second storing means;

means for generating the sequential address of said first instruction and for loading it into said first address register in response to said first instruction being transferred to said execution register and the addressed location of said jump address of said first instruction being in said second storing means; and wherein, in response to loading a binary instruction from said first or second memory into said execution register, the sequential instruction and jump instruction specified thereby are simultaneously prefetched so that when said path choice is made, the next instruction to be executed will already be addressed for loading into said execution register.

4. A dual fetch microinstruction sequencer comprising:

a first memory for storing odd addressed microinstructions from a homogeneous microprogram having binary conditional branch microinstructions each of which specifies a jump address and a sequential address wherein the jump address and sequential address for each microinstruction have opposite odd/even polarities;

a second memory for storing even addressed microinstructions from said microprogram;

a first address register coupled to said first memory for addressing microinstructions therein;

a second address register coupled to said second memory for addressing microinstructions therein;

an execution register for receiving executable microinstruction fields of said microprogram microinstructions;

means for selectively loading executable microinstruction fields of an addressed microinstruction from either said first or second memory into said execution register;

means responsive to the odd/even polarity of the jump address of a binary conditional branch microinstruction whose executable field is loaded into said execution register by said loading means from either said first or second memory for coupling said jump address to one address register of said first and second address registers, said one register being connected to the memory of said first and second memories storing the addressed location of said jump address and for coupling said sequential address to the other address register of said one of said first and second address registers; and said jump address and said sequential address being loaded simultaneously wherein the jump instruction and sequential instruction of said binary conditional branch instruction in said execution register are simultaneously prefetched.

5. The sequencer recited in claim 4 further comprising first and second means responsive to control signals for respectively isolating the outputs of said first and second memories from said execution register.

6. The sequencer recited in claim 4 wherein said first address coupling means comprises means responsive to control signals for isolating the address fields of said first and second memories from both said first and second address registers.

7. The sequencer recited in claim 6 wherein said second address coupling means comprises an incrementor coupled to the output of said first address register, said incrementor having its output coupled through logic controlled isolators to said first and second address registers.

8. A dual fetch instruction sequencer comprising:
a first memory for storing odd addressed microinstructions from a homogeneous microprogram having opposite odd/even polarities for the two possible next addresses for each binary conditional branch microinstruction;
a second memory for storing even addressed microinstructions from said microprogram;
a first address register coupled to said first memory for addressing instructions therein;
a second address register coupled to said second memory for addressing instructions therein;
an execution register for executing executable microinstruction fields received from either said first or second memory;
means for selectively loading executable microinstruction fields from either said first or second memories into said execution register;
means for providing a first address to said first register, said first address corresponding to an odd jump address as specified by a binary conditional branch microinstruction whose executable field is loaded into said execution register; and
means for providing a second address to said second register, said second address corresponding to the next sequential address of said microinstruction whose executable field is loaded into said execution register, said means for providing said second address comprising means for deriving said second address from the address of said microinstruction whose executable field is loaded into said execution register.

9. The sequencer recited in claim 8 wherein said deriving comprises a logic incrementor.

10. A dual fetch instruction sequencer having transparent overlay capability, comprising:
a first address register coupled to a first memory for addressing instructions therein; a second address register coupled to a second memory for addressing instructions therein; said
first and second memories for storing instructions from a homogeneous microprogram having conditional branch instructions wherein the next possible instructions of each conditional branch instruction are stored in opposite ones of said first and second memories wherein both of the next possible instructions can be simultaneously fetched, one from each memory via said first and second address registers respectively;
an execution register coupled to the outputs of said first and second memories for receiving instruction fields from either one of said first or second memories for homogeneously executing said microprogram;
means for determining a microcycle corresponding to when an instruction is being fetched from only said first memory leaving said second memory available for rewriting; and
means responsive to said determining means for writing a new instruction into said second memory during said microcycle.

11. The method of simultaneously prefetching both next possible instructions of a binary decision program instruction specifying a jump address and having the other path being to the next sequential address, comprising the steps of:
storing said program in a plurality of memories wherein the addressed location of said jump address and said sequential address for each binary decision instruction are in different ones of said plurality of memories, each of said memories having a corresponding address register;
reading a binary decision instruction from one of said plurality of memories into an execution register;
loading a first address corresponding to the jump address of said execution register instruction into the address register corresponding to the memory of the addressed location of said jump address; and
loading a second address corresponding to the sequential address of said execution register instruction into the address register corresponding to the memory of the address location of said sequential address.

* * * * *